F. CALDWELL.
VALVE FOR GASOLENE AND OTHER LIQUID FUELS.
APPLICATION FILED JUNE 19, 1916.

1,253,143.

Patented Jan. 8, 1918.

WITNESSES
C. O. menzfer
Berl R. Davis

INVENTOR
Frank Caldwell,
by John Elias Jones,
ATTORNEY

UNITED STATES PATENT OFFICE.

FRANK CALDWELL, OF CINCINNATI, OHIO.

VALVE FOR GASOLENE AND OTHER LIQUID FUELS.

1,253,143.	Specification of Letters Patent.	Patented Jan. 8, 1918.

Application filed June 19, 1916. Serial No. 104,612.

*To all whom it may concern:*

Be it known that I, FRANK CALDWELL, a citizen of the United States, and a resident of Cincinnati, in the county of Hamilton and State of Ohio, have invented certain new and useful Improvements in Valves for Gasolene and other Liquid Fuels, of which the following is a specification.

This invention relates to valve or controlling and commingling devices for use in connection with gasolene and other liquid fuels, and especially where a nicety and accuracy of adjustment and mixing are required.

Figure 1:
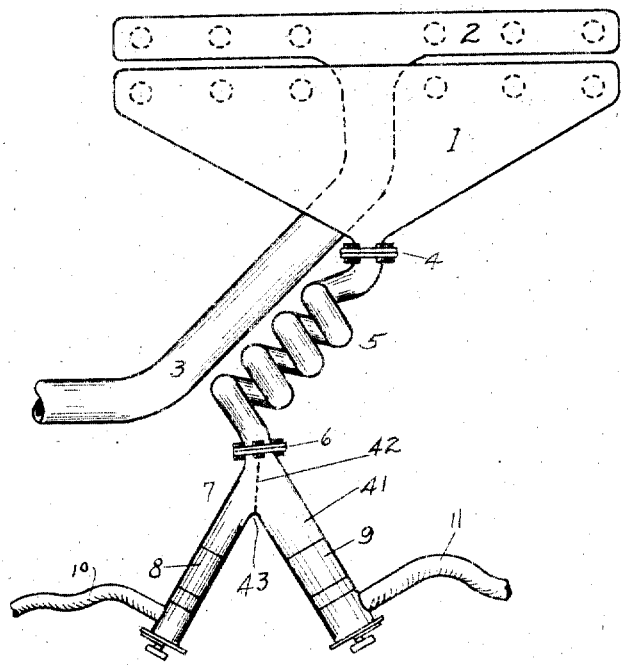
Figure 2:
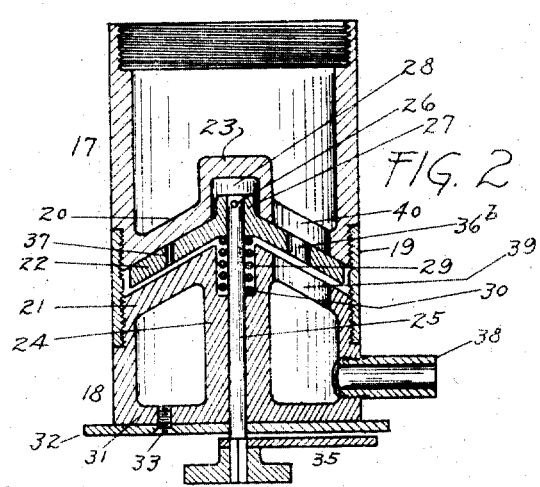

The object of the invention herein, together with its description in detail, will be fully hereinafter referred to in connection with the accompanying sheet of drawings, in which latter, Figure 1 is a diagrammatic view of a liquid-fuel vaporizing-apparatus in connection with which my invention herein is especially adapted for use; Fig. 2, a vertical section of the valve in its preferred form; and Fig. 3, a plan view of the valve or regulating-disk, showing the graduated, circular series of openings or ports made therein.

In describing my device herein I will begin by referring to the apparatus of which my present improvement is a part, in which, 1 indicates the intake-manifold, and 2 the exhaust-manifold, the ports of each being shown in dotted-circles.

The exhaust-manifold has a pipe 3 leading to the muffler, as customary, such pipe 3 being broken off and the muffler omitted.

The intake-manifold has a suitable flange-joint connection 4 with a coil or tortuous-passage 5, the latter, in turn, having a flange-joint connection 6 with a Y-branch 7.

One branch of the Y-member 7 has screw-threaded connection with a gas controlling chamber 8 and the other branch of said member 7 has screw-threaded connection with an air controlling chamber 9.

The controlling-chambers 8 and 9 are supplied with flexible-conductors 10 and 11, respectively, the conductor 10 leading to the gas-supply and the conductor 11 leading to a suitable air supply means.

It is in connection with the specific structure of each of the gas and air controlling-chambers 8 and 9, respectively, that I have to deal with principally herein, as those features form the essential elements of the invention herein and, both of said controlling devices being practically alike, I will proceed to describe the one for controlling the air supply, which will answer for both.

The said air-controlling device is composed of a shell made up of two cylindrical parts 17 and 18, the part 17 having its outer-end internally screw-threaded for attachment to an externally-threaded end of one of the branches 41 of the Y-member 7. The two cylindrical portions 17 and 18 are shouldered and externally-threaded at their adjacent ends to provide for a coupling band or ring 19, the latter being internally-threaded and adapted to secure the said adjacent ends of the members 17 and 18 at the desired distance or space apart, as best shown in Fig. 2. The said adjacent ends of the members 17 and 18 are made correspondingly sloping so as to provide the concave-end 20 in the member 17 and the convex-end 21 in the member 18, the space between said ends 20 and 21 forming a valve-chamber in which a disk 22 is placed, such disk taking the same slope, or being of the same conical form to suit the adjacent faces of said adjacent ends of the members 17 and 18 and with its upper or convex face in contact with the lower concave-face of the end 20 of the said member 17 but free to be duly rotated within the chamber between the said ends 20 and 21. The end 20 has a central-extension 23 and the member 18 has a central-tubular portion 24, for the accommodation of the valve-stem 25. The inner end of the valve-stem 25 is secured in place by means of a cross-pin 26 to an extension 27 made at the center of the disk 22, such extension 27 being shallower than and extending within the socket 28 made in the central-extension 23 of said bottom 20. A spiral spring 29 encircles the valve-stem 25 within a central-bore 30 made in the upper end of the member 18 and its purpose is to keep the upper face of the disk 22 in frictional-contact with the lower face of the bottom 20 so that it shall freely seat and be duly held in adjusted position thereon and, at the same time, be adapted to be rotated thereunder. The outer-end of the valve-stem 25 extends beyond the outer-end 31 of the member 18 to which outer-end 31 a plate 32 capable of receiving a dial is attached by means of a screw 33, and said outer-end of the valve-stem is made square to accommodate a knob or turning-button 34 that may have a pointer 35, the latter being adapted to be manipulated, as customary, in relation with the dial plate 32 to coöperate with a suitable dial carried thereby.

Figure 3:
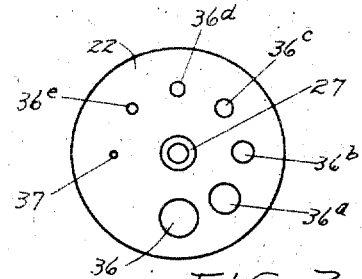

A circular series of perforations 36, 36ª, 36ᵇ, 36ᶜ, 36ᵈ, 36ᵉ, that are of gradually decreasing diameters down to the one 37 of least diameter are made in the conical valve-disk 22, as best shown in Fig. 3, but also shown in Fig. 2, the latter view, however, showing but two of such perforations.

38 indicates the air-inlet leading into the chamber 18, and 39 indicates the port-hole in the convex-end 21 of said chamber 18, such port-hole 39 being the exit for the air into the valve-chamber where it is under the control of the valve 22 for passage through the desired one of the graduated port-holes in said valve into and through the orifice 40 made in the concave-bottom 20 of the air-chamber 17, whence it passes onwardly into the branch 41 of the Y-member 7, and thence encounters the baffle or partition 42 that is located in said Y-branch from the crotch 43 thereof centrally across to the flange-joint member 6, the baffle feature being as best shown dotted in Fig. 1. The description of the air-controlling member 9 will answer as well for that of the gas-controlling member 8, but the latter is of somewhat lesser capacity or size in relation to said member 9, for the reason that it is customary to have the gas-passages of lesser capacity than those of the air-passages in apparatus of this character. The baffle or partition 42 is provided in the throat of the Y-member 7 so as to receive the pressure of air and gas on its opposite sides and to deliver them at the flange-joint 6, where the air and gas are mixed and pass onwardly into the coil or tortuous spiral 5, where such admixture becomes further intermingled until it reaches the flange-joint 4, whence it passes into the intake-manifold 1 ready for discharge into the place of combustion and use.

It will be observed that, in use, the valve controlling parts are in easy reach for adjustment by the operator for his ready control.

I claim:—

1. A valve of the character described comprising a pair of axially alined cylinders, one of which cylinders is internally threaded at its outer end, and the other of which is provided with a dial plate secured to its outer end and has an inlet at one side, the inner adjacent ends of said cylinders having opposing conical end walls and being externally threaded, a threaded ring connecting the said inner ends of the cylinders in spaced opposing relation, said conical end walls having openings opposite one another and communicating between the cylinders, a conical valve disk disposed in the space between the end walls, and having an annular series of graduated openings for alinement with the said openings of the end walls, a valve stem mounted axially through one of said cylinders and to which the valve disk is connected, said stem having an exteriorly projecting end provided with a handle, and means whereby to normally hold the valve disk in seated relation against one of the adjacent end walls.

2. A valve of the character described comprising a pair of axially alined cylinders, one of which cylinders is internally threaded at its outer end, and the other of which is provided with a dial plate secured to its outer end and has an inlet at one side, the inner adjacent ends of said cylinders having opposing conical end walls and being externally threaded, a threaded ring connecting the said inner ends of the cylinders in spaced opposing relation, said conical end walls having openings opposite one another and communicating between the cylinders, a conical valve disk disposed in the space between the end walls, and having an annular series of graduated openings for alinement with the said openings of the end walls, a valve stem mounted axially through one of the said cylinders and to which the valve disk is connected, said stem having an exteriorly projecting end provided with a handle, means whereby to normally hold the valve disk in seated relation against one of the adjacent end walls, said means consisting of a spring coiled around the valve stem, and bearing against the valve disk at one side, one of the cylinders having a bore in its inner end in which the spring is seated.

3. A valve comprising a pair of axially alined cylinders, having spaced opposing conical inner end walls, means connecting said cylinders in detachable relation, the said inner conical walls of said cylinders having opposed openings communicating between the cylinders, a conical valve disk disposed within the space between the inner ends of the cylinders and against one of the said conical end walls, and provided with an annular series of graduated openings for alinement with the openings of the end walls, a valve stem having a handle at its outer end, said stem being mounted axially of the said cylinders and connected at its inner end to the valve disk.

FRANK CALDWELL.

Witnesses:
JOHN ELIAS JONES,
BERL R. DAVIS.